(12) United States Patent
Trebouet

(10) Patent No.: US 12,043,223 B2
(45) Date of Patent: Jul. 23, 2024

(54) MOTOR VEHICLE DRIVER ASSISTANCE SYSTEM

(71) Applicant: Valeo Systèmes d'Essuyage, Le Mesnil Saint Denis (FR)

(72) Inventor: Marcel Trebouet, Le Mesnil Saint Denis (FR)

(73) Assignee: VALEO SYSTÈMES D'ESSUYAGE, Le Mesnil Saint Denis (FR)

( * ) Notice: Subject to any disclaimer, the term of this patent is extended or adjusted under 35 U.S.C. 154(b) by 687 days.

(21) Appl. No.: 17/279,944

(22) PCT Filed: Sep. 25, 2019

(86) PCT No.: PCT/EP2019/075942
§ 371 (c)(1),
(2) Date: Mar. 25, 2021

(87) PCT Pub. No.: WO2020/064881
PCT Pub. Date: Apr. 2, 2020

(65) Prior Publication Data
US 2021/0387598 A1 Dec. 16, 2021

(30) Foreign Application Priority Data
Sep. 28, 2018 (FR) .................................. 1858955

(51) Int. Cl.
*B60S 1/56* (2006.01)
*B08B 1/16* (2024.01)
(Continued)

(52) U.S. Cl.
CPC .............. *B60S 1/566* (2013.01); *B08B 1/165* (2024.01); *B08B 1/30* (2024.01); *B08B 13/00* (2013.01);
(Continued)

(58) Field of Classification Search
CPC ......... B60S 1/566; B60S 1/3404; B60S 1/485
See application file for complete search history.

(56) References Cited

U.S. PATENT DOCUMENTS 3,703,017 A * 11/1972 Edwards ................. B60S 1/483
15/250.02
2011/0016653 A1 1/2011 Caillot et al.
(Continued)

FOREIGN PATENT DOCUMENTS

AU 2016298390 A1 3/2018
CN 102225690 A 10/2011
(Continued)

OTHER PUBLICATIONS

Notice of Reason for Rejection in corresponding Japanese Application No. 2021-517481, dated Jun. 7, 2022 (12 pages).
(Continued)

*Primary Examiner* — Natasha N Campbell
(74) *Attorney, Agent, or Firm* — Osha Bergman Watanabe & Burton LLP

(57) ABSTRACT

The invention relates to a motor vehicle driver assistance system (100) comprising at least one detection module (101) and a cleaning device (120), the detection module (101) comprising at least one driver assistance sensor (110, 130) and at least a protective window (140) closing the detection module (101) and protecting the at least one driver assistance sensor (110, 130), the cleaning device (120) being configured to clean the protective window (140) and the cleaning device (120) comprising at least one wiper (121) in contact with the protective window (140) and able to move in a rectilinear main direction (D).

10 Claims, 3 Drawing Sheets

(51) Int. Cl.
  *B08B 1/30* (2024.01)
  *B08B 13/00* (2006.01)
  *B60S 1/34* (2006.01)
  *B60S 1/50* (2006.01)
  *B60S 1/52* (2006.01)
  *G02B 27/00* (2006.01)

(52) U.S. Cl.
  CPC ............... *B60S 1/3404* (2013.01); *B60S 1/50* (2013.01); *B60S 1/524* (2013.01); *G02B 27/0006* (2013.01)

(56) References Cited

U.S. PATENT DOCUMENTS

| | | | |
|---|---|---|---|
| 2013/0092758 A1 | 4/2013 | Tanaka et al. | |
| 2016/0121855 A1 | 5/2016 | Doorley et al. | |
| 2017/0369039 A1 | 12/2017 | Rousseau | |
| 2018/0009418 A1* | 1/2018 | Newman | B08B 3/02 |
| 2018/0194328 A1* | 7/2018 | Numakunai | G03B 17/02 |

FOREIGN PATENT DOCUMENTS

| | | | |
|---|---|---|---|
| CN | 103097210 A | 5/2013 |
| CN | 105537171 A | 5/2016 |
| CN | 105620425 A | 6/2016 |
| DE | 102013213415 A1 | 1/2015 |
| DE | 102016006039 A1 | 11/2016 |
| DE | 102015210469 A1 | 12/2016 |
| FR | 3031943 A1 | 7/2016 |
| JP | H02-124418 A | 5/1990 |
| JP | H05-028759 U | 4/1993 |
| JP | 2011-515274 A | 5/2011 |
| JP | 2016-009099 A | 1/2016 |
| JP | 2017-535467 A | 11/2017 |
| JP | 2018-502772 A | 2/2018 |
| WO | 2015161097 A1 | 10/2015 |
| WO | 2016/116568 A1 | 7/2016 |
| WO | 2018091641 A1 | 5/2018 |

OTHER PUBLICATIONS

Office Action issued in Chinese Application No. 201980064175.X mailed on Apr. 27, 2023 (17 pages).
International Search Report and Written Opinion in corresponding International Application No. PCT/EP2019/075942, mailed Dec. 5, 2019 (13 pages).

* cited by examiner

MOTOR VEHICLE DRIVER ASSISTANCE SYSTEM

The present invention relates to a motor vehicle driver assistance system, and more particularly the invention relates to a cleaning device associated with a detection module of such a driver assistance system.

Vehicles, in particular motor vehicles, increasingly comprise automated systems that are driver assistance systems in particular. Such driver assistance systems comprise in particular one or more module(s) for detecting the surroundings of the vehicle and external parameters of this vehicle, and also at least one control unit configured to interpret the information thus gathered and to make decisions that need to be made as a result of this information.

Therefore, it will be understood that it is particularly important to check that these detection modules are operating properly throughout the lifetime of the vehicle. In particular, these detection modules are usually arranged on the outside of the vehicle, for example carried on the body of this vehicle, and may for example get dirty, possibly making it difficult, if not impossible, for these detection modules to acquire information. It is therefore necessary to provide a cleaning system capable of effectively removing detritus, dirt, organic matter and other disruptive elements. One solution is to spray a large quantity of liquid onto, and then to dry, an optical surface of the detection module in question, but such a solution can be costly in terms of washer fluid, or water, even more so in the case of self-driving vehicles, in which numerous detection modules are employed around the perimeter of the vehicle.

In addition, because they are positioned on the outside of the vehicle, these detection modules may become damaged in the event of impacts. Even at low speed, such impacts may lead to irreversible damage to these detection modules.

The present invention falls within this context and seeks to address at least the disadvantages that have just been mentioned.

One subject matter of the present invention is thus a driver assistance system for motor vehicle comprising at least a detection module and a cleaning device, the detection module comprising at least one driver assistance sensor and at least a protective window closing the detection module and protecting the at least one driver assistance sensor, the cleaning device being configured to clean the protective window and the cleaning device comprising at least one wiper in contact with the protective window and able to move in a rectilinear main direction of displacement.

The protective window is thus configured to, in particular, protect the at least one driver assistance sensor from potential external attack which could irreversibly damage it. Thus, this protective window is arranged facing the said at least one driver assistance sensor, namely between the driver assistance sensor and the roadscene on which the vehicle, for which the driver assistance system according to the invention is intended, is driving.

What is meant by a "rectilinear main direction of displacement" is that the wiper moves, notably back and forth, along a straight line when the protective window is planar or else in a direction along a curvature of this protective window in a plane that is transverse and perpendicular, or near-perpendicular, to a main plane of extension of the protective window.

The use of a mechanical cleaning device, which is to say a cleaning device which comprises a wiper arranged in contact with the surface that is to be cleaned—in this instance the protective window—means that the consumption of a washer fluid can be optimized. Indeed it will be appreciated that it is notably the rubbing of the wiper against the protective window that achieves the cleaning of this protective window, and that a spraying of washer fluid then merely supplements this, for example when the rubbing of the wiper against the protective window is not enough, by itself, to completely clean said window.

In addition, the fact that the wiper is in contact with the protective window, namely with surface distinct from an optical surface of the at least one driver assistance sensor, means that the rubbing of the wiper blade does not scratch this optical surface of the driver assistance sensor. Advantageously, it will be appreciated that if this protective window becomes scratched, or an impact damages or completely breaks the protective window, this window is easier and less expensive to replace than the at least one driver assistance sensor itself.

According to one feature of the present invention, the wiper comprises at least one washer fluid distribution duct configured to be connected to a washer fluid reservoir. At least one spray nozzle for this washer fluid may be provided on the washer fluid distribution duct. Advantageously, the use of such a wiper makes it possible to better target the spraying of washer fluid, namely to spray this washer fluid as close as possible to the wiper making it possible to improve the effectiveness of this cleaning, while at the same time optimizing the quantity of washer fluid required. In other words, the use of a wiper incorporating such a distribution duct and equipped with spray nozzles makes it possible to further reduce the quantity of washer fluid required for each washing, and therefore to reduce the size of the reservoir containing this washer fluid and therefore reduce the overall weight of the vehicle into which such a driver assistance system is incorporated.

Alternatively, the driver assistance system may comprise a washer fluid spray nozzle distinct from the wiper, namely arranged a non-zero distance away from this wiper. For example, this spray nozzle may be retractable, namely may adopt at least a first position in which it is able to spray the washer fluid, and a second position in which it is retracted and therefore incapable of spraying the washer fluid.

According to one feature of the present invention, the protective window comprises at least an interior face facing toward the at least one driver assistance sensor, this interior face comprising an anti-reflection coating.

According to one feature of the present invention, the protective window may have a curvature identical, or nearly identical, to a curvature of the at least one driver assistance sensor.

According to one embodiment of the driver assistance system according to the present invention, the detection module comprises at least a first driver assistance sensor and at least a second driver assistance sensor, the protective window protecting both the first driver assistance sensor and the second driver assistance sensor.

In order for the protective window to be able to protect both the first driver assistance sensor and the second driver assistance sensor it will be appreciated that this first driver assistance sensor and this second driver assistance sensor are positioned in the vicinity of one another. For example, the first driver assistance sensor and the second driver assistance sensor are arranged one after the other in a transverse direction.

Advantageously, the first driver assistance sensor and the second driver assistance sensor may jointly contribute to detecting one or more events in a roadscene. For example, the means implemented by this first sensor and by this second sensor, respectively, complement one another. As will be detailed more frilly hereinbelow, the first driver assistance sensor may for example be a long-range sensor configured to perform image reconstruction following the emission/receipt of waves, and the second driver assistance sensor may for example be a direct image-acquisition device, for example a wide-angle camera. Thus, the combination of the information gathered by the first driver assistance sensor and by the second driver assistance sensor is combined in such a way as to obtain complete information regarding the roadscene concerned.

Advantageously, the use of two complementary driver assistance sensors also makes it possible to mitigate against a potential fault with one or other of these driver assistance sensors, it nevertheless being appreciated that, in the event of a fault with one of these driver assistance sensors, the information regarding the roadscene concerned may be degraded.

According to this embodiment, the protective window may comprise at least a first portion which protects the first driver assistance sensor and at least a second portion which protects the second driver assistance sensor, the cleaning device being configured to clean the first portion of the protective window and the second portion of the protective window. In other words, it will be appreciated that the wiper is configured to wipe the entirety of a surface of the protective window. According to the invention, the protective window is of one-piece, which is to say that the first portion of this protective window and the second portion of this protective window form a single assembly which cannot be dismantled without causing damage to one or other of these portions. For example, the first portion and the second portion of this protective window may be arranged one after the other in a direction parallel to the transverse direction in which the first driver assistance sensor and the second driver assistance sensor are aligned.

According to the invention, the rectilinear main direction of displacement of the wiper is also parallel to the transverse direction of alignment of the driver assistance sensors and, therefore, also parallel to the direction of alignment of the first portion and of the second portion of the protective window.

Advantageously, the cleaning device may be configured to clean the first portion of the protective window and the second portion of this protective window alternately. As mentioned hereinabove, the first driver assistance sensor and the second driver assistance sensor both contribute to the acquisition of images of the same roadscene which means that it is sufficient for just one of them to be functional in order for detection to be able to occur. Thus, the present invention allows the cleaning of the one or of the other while maintaining, at least in part, the associated roadscene-analysis function.

For example, the first driver assistance sensor may be a detection member using wave emission. A "detection member using wave emission" is understood to be a member configured to determine a distance separating it from any object by emitting at least one wave and measuring the time it takes for this wave to return. In other words, the distance is calculated by measuring the time between the emission of the wave and the detection of a reflection of this wave by the object in question. Thus, on the basis of the time measured and the theoretical speed of propagation of the wave, the detection member is configured to determine the distance separating it from the object from which the wave has been reflected. In the description, the terms "detection member" and "detection member using wave emission" are used indiscriminately.

The protective window arranged upstream of this detection member is arranged in a path taken by the waves emitted by the detection member, the protective window being permeable at least to the wavelengths emitted by the detection member. Advantageously, it will be appreciated that such a protective window is easier to clean than an optical surface of the detection member.

The protective window is treated, on the one hand so that it does not reflect these waves emitted by the detection member, and on the other hand to allow these waves to pass, in both directions, namely from the detection member toward the outside of the vehicle, and from the outside of the vehicle toward the detection member, so that it can, as mentioned hereinabove, calculate the time taken for these waves to be reflected. For example, these waves may be light waves, or radioelectric waves, or else sound waves.

As mentioned here above, the protective window may have a curvature identical, or nearly identical, to a curvature of the first driver assistance sensor. For example, when the waves emitted by the detection member are light waves, this detect on member may comprise at least one curved lens configured to shape a light beam. The protective window may therefore have a curvature identical, or nearly identical, to the curvature of this lens. The use of a protective window perfectly matched to this curvature notably makes it possible to avoid reflection of the light beams emitted by the detection member. Advantageously, it also allows the overall bulkiness of the driver assistance system according to the invention to be reduced, thereby for example making it easier to install on the vehicle for which it is intended. It must be appreciated that, according; to this feature of the present invention, the cleaning device intended for cleaning the protective window, and more particularly the wiper of this cleaning device, is configured to conform to the curvature of the protective window.

According to another feature of the present invention, the second driver assistance sensor may be a camera.

The present invention also relates to a motor vehicle comprising at least one driver assistance system according to the invention.

The present invention also relates to a method for cleaning a driver assistance system according to the invention, comprising at least a step during which at least a driver assistance sensor detects the presence of a disruptive element on the protective window, a step during which the at least one driver assistance sensor issues a corresponding first item of information to a control unit, and a step during which the control unit issues a first instruction allowing the cleaning device to clean the protective window. What is meant here by "cleaning the protective window" is the collection of steps allowing this cleaning, namely the spraying of the washer fluid onto the protective window and/or the setting of the wiper in motion to wipe this protective window. Furthermore, what is meant by "disruptive element" is all kinds of deposit that may accumulate on the protective window and that disrupt the acquisition of a faithful image of the roadscene under analysis. For example, this disruptive element may be dirt or a piece of organic matter.

The step of detecting the disruptive element, whether this be dirt or any other type of deposit that impedes image acquisition, may for example be performed by the driver assistance sensor itself, or else by a control unit configured to process the image acquired by this driver assistance sensor.

The invention finally relates to a method comprising at least one step during which control unit receives a first item of information issued by the first driver assistance sensor or a second item of information issued by the second driver assistance sensor, this first item of information or this second item of information relating, respectively, to the presence of a disruptive element on the first portion of the protective window or on the second portion of the protective window, and a step during which the control unit issues a first instruction allowing the cleaning device to clean the first portion of the protective window if it has received the first item of information issued by the first driver assistance sensor or a second instruction allowing the cleaning device to clean the second portion of the protective window if it has received the second item of information issued by the second driver assistance sensor.

Advantageously, it will be appreciated that, using this method, the portions of the protective window are cleaned alternately so that at least one of the two driver assistance sensors is able to operate.

Other features, details and advantages will become more clearly apparent on reading the detailed description given below by way of indication in relation to one embodiment of the present invention, which embodiment is illustrated in the following figures:

FIG. 1 schematically depicts a motor vehicle, viewed front above, according to the present invention and incorporating several driver assistance systems, of which at least one is in accordance with the present invention;

FIG. 2 schematically illustrates a view in transverse section, as seen from above, of the driver assistance system according to the invention, this driver assistance system comprising at least one detection module and a cleaning device;

In the rest of the description, the terms "longitudinal", "transverse" and "vertical" are with reference to an orientation of a driver assistance system 100 according to the invention when the latter is incorporated into a vehicle. Thus, the term "longitudinal" corresponds to a direction parallel to a longitudinal axis L of a trihedron L, V, T shown in the figures, the term "transverse" corresponds to a direction parallel to a transverse axis T of this trihedron, the transverse axis being perpendicular to the longitudinal axis L, and the term "vertical" corresponds to a direction parallel to a vertical axis V of the trihedron, this vertical axis V being perpendicular to the longitudinal axis L and to the transverse axis T. A transverse section refers to a section taken on a longitudinal and transverse plane, namely a plane containing the longitudinal axis L and the transverse axis T of the L, V, T trihedron illustrated.

Figure 1:
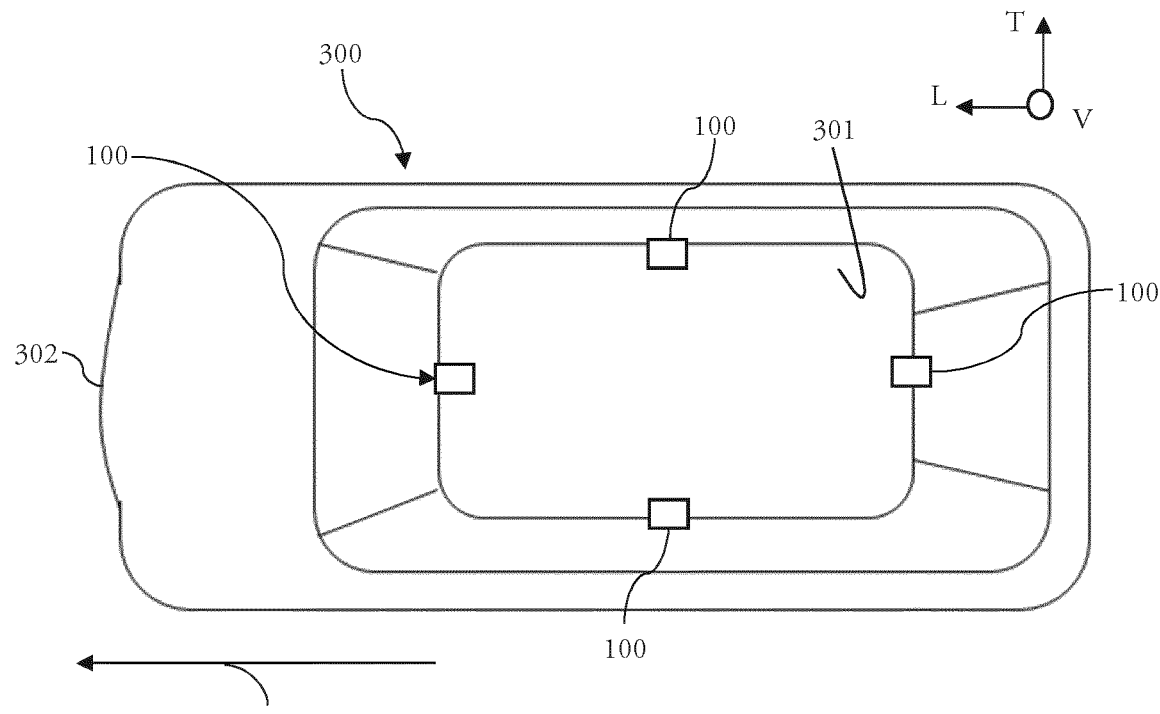

FIG. 1 is a view, from above, of a motor vehicle 300 comprising at least one driver assistance system 100 according to the invention. More particularly, according to the example illustrated here, the motor vehicle 300 comprises a plurality of driver assistance systems 100, of which at least one is produced in accordance with the invention. As illustrated, these driver assistance systems are arranged along the edges of a roof 301 of the motor vehicle 300, although other locations could be envisioned. In this particular instance, the motor vehicle 300 depicted comprises a driver assistance system 100 arranged at the front of the vehicle 300, a driver assistance system 100 arranged at the rear of the vehicle, and two driver assistance systems 100 arranged laterally on the vehicle 300. Thus, data pertaining to the entire environment of the motor vehicle 300, namely over 360° around this motor vehicle 300, can be acquired. The terms "front" and "rear" of the vehicle 300 are understood here with reference to a main direction of travel S of this vehicle 300.

One of these driver assistance systems 100, and more particularly a driver assistance system 100 produced according to the invention, will now be described in greater detail, it being appreciated that all of the driver assistance systems 100 depicted in FIG. 1 can be produced in accordance with the invention, or else just some of them can, without departing from the context of the invention.

Figure 2:
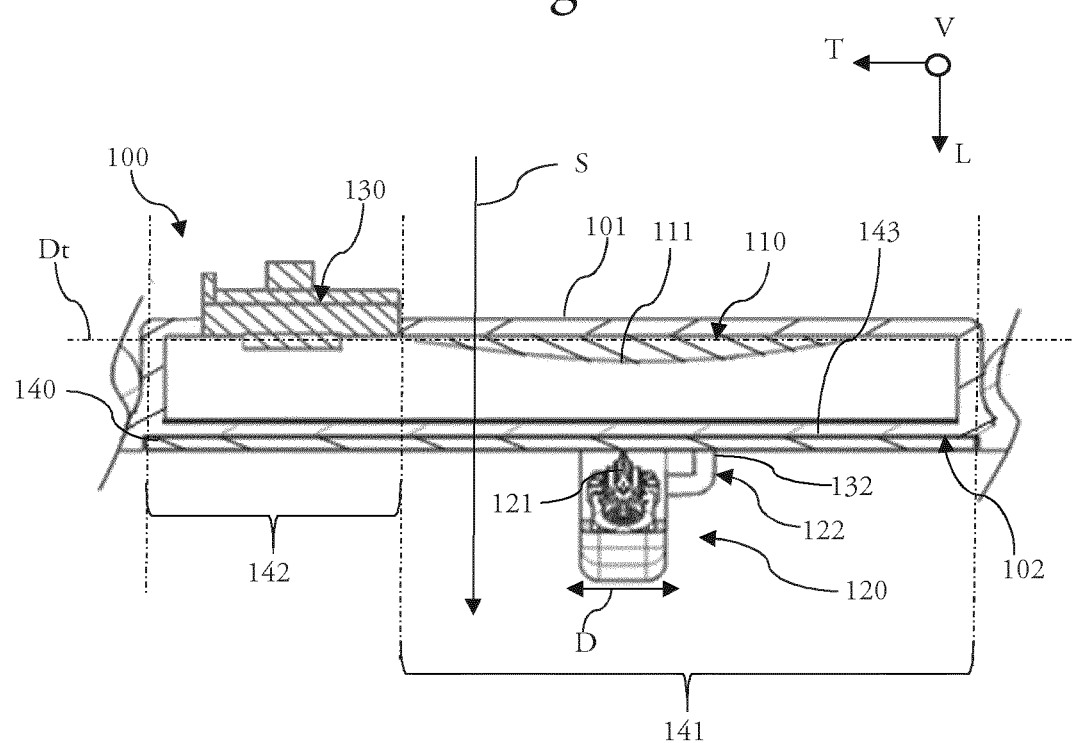

FIG. 2 is a depiction of a transverse section through the driver assistance system 100 according to the invention. This driver assistance system 100 notably composes a detection module 101 and a cleaning device 120. As depicted, the detection module 101 houses at least one driver assistance sensor 110, 130 and is closed, in part, by a protective window 140 protecting this at least one driver assistance sensor 110, 130. What is meant by "driver assistance sensor" is a member configured to acquire data relating to an environment external to the vehicle for which the driver assistance systems 100 according to the invention is intended and to transmit the data thus acquired to a control unit which for its part is configured to issue, as a result of this information received, one or more instructions to trigger or assist with a vehicle manoeuvre.

More particularly, according to the example illustrated here, a first driver assistance sensor is a detection member 110 using wave emission, for example electromagnetic wave emission, which means to say that this detection member 110 is configured to evaluate a distance separating it from any object by measuring the time between an instant t at which it emits a wave and an instant t1 at which this wave is reflected. Thus, this detection member 110 comprises at least one emitting member configured to emit at least one wave and at least one receiving member configured to receive the reflected wave. In the drawings, the detection member 110 is depicted schematically, which means that neither the emitting member nor the receiving member is visible.

According to various examples as to how the present invention can be embodied, these waves may be radioelectric waves, in which case the detection member is known as a RADAR (RAdio Detection And Ranging) member, or else light waves, for example a laser beam, in which case the detection member is referred to as an LIDAR (Light Detection And Ranging) member. According to the example illustrated in FIG. 2, the first driver assistance sensor is a LIDAR sensor, which means that it emits light waves and thus comprises at least one curved lens 111, configured to shape these light waves.

It must be appreciated that these are merely examples of how the present invention can be embodied and that the first driver assistance sensor could be formed of a different member without departing from the context of the present invention.

For example, the driver assistance system 100 according to the invention may be intended to be incorporated into a self-driving, or partially self-driving vehicle. It will be appreciated that this detection member 110 needs to be able to operate optimally in all circumstances. In order to optimize the acquisition of images by the driver assistance system 100 according to the invention, the detection module 101 may also house a second driver assistance sensor 130 configured to analyse substantially the same roadscene as the detection member 110. According to the example illustrated, this second driver assistance sensor 130 is arranged in the vicinity of the detection member 110, and more particularly, the first driver assistance sensor 110 and the second driver assistance sensor 130 are aligned in a transverse direction Dt. According to the example illustrated here, this second driver assistance sensor is a camera 130.

In other words, it will be appreciated that the first driver assistance sensor 110 and the second driver assistance sensor 130 are dedicated to acquiring data regarding the one same roadscene, in this instance situated ahead of the vehicle, the first driver assistance sensor 110 allowing image reconstruction and the second driver assistance sensor 130 for its part allowing direct image acquisition. It will be appreciated that this is merely one example and that the driver assistance system 100 according to the invention is able to be positioned anywhere on the vehicle.

Advantageously, the protective window 140 is arranged facing the detection module, and more particularly in this instance upstream of the detection module 101 with respect to the direction S of travel of the motor vehicle, so that it is configured to protect this detection module, notably from potential external attack, for example against thrown-up stone chippings or other objects that may be present on the roadway.

As depicted, the detection module 101 also comprises a receiving zone 102 into which the protective window 140 is fitted, which means to say that this protective window 140 at least partially closes this detection module 101. Thus, this protective window 140 is arranged in the path taken by the waves emitted by the detection member 110. It will therefore be appreciated that this protective window 140 absolutely must be treated in order to ensure correct operation of this detection member 110. Thus, according to the invention, the protective window 140 is, on the one hand, made from a material that allows the wavelengths of the waves emitted by the detection member 110 to pass, or treated for this purpose, and, on the other hand, an anti-reflection treatment is applied to this protective window 140 so that the waves emitted by the detection member 110 pass in their entirety through this protective window 140. More specifically, it will be appreciated that the anti-reflection treatment is applied to an interior face 143 of the protective window 140, namely to a face of this protective window 140 which faces towards the detection member 110. According to the example illustrated here, this protective window 140 extends in a plane but it would also be possible to provide for this protective window to be curved, and advantageously for it to have a curvature identical, or nearly identical, to the curvature of the lens 111 of the detection member 110, where appropriate.

Furthermore, the protective window 140 may be artificially divided into a first portion 141 intended to protect the detection member 110 and a second portion 142 intended to protect the camera 130. What is meant by "artificially divided" is the fact that the protective window is of one-piece, which is to say that the first portion 141 and the second portion 142 of this protective window 140 form a single assembly which cannot be dismantled without causing damage to one or other of these portions 141, 142. It will also be noted that the first portion 141 and the second portion 142 of the protective window 140 are advantageously aligned along an axis parallel to the transverse straight line Dt on which the detection member 110 and the camera 130 are aligned.

As mentioned hereinabove, the driver assistance system 100 according to the invention comprises at least one cleaning device 120 dedicated to cleaning the protective window 140. In the context of that which was described hereinabove, the cleaning device 120 is configured to clean one or the other of the portions 141, 142 of the protective window 140 alternately. Advantageously, it will be appreciated that that makes it possible to ensure that the detection member 110 and the camera 130 are not both unsighted simultaneously, namely to ensure that the function of detecting the roadscene situated ahead of the vehicle is permanently maintained, at least in a degraded form. According to the invention, it will be appreciated that this cleaning device 120 thus makes it possible, lastingly, to ensure the data acquisition function performed by the driver assistance sensors 110, 130 of the detection module 101.

This cleaning device 120 notably comprises a wiper 121 mounted with the ability to move with respect to the protective window 140 and arranged in contact with this protective window 140. As schematically depicted in FIG. 2, this wiper 121 is able to move in a rectilinear main direction D. In the example illustrated here in which the protective window 140 has a planar profile, this direction D follows a pure straight line, which falls inside a main plane of extension of the protective window 140. In other words, this rectilinear main direction D is parallel to the transverse direction Dt of alignment of the driver assistance sensors 110, 130, which is to say also parallel to the axis of alignment of the two portions 141, 142 of the protective window 140.

The cleaning device 120 will now be described in greater detail with reference to FIG. 3, which is a perspective view of the driver assistance system 100 according to the invention.

The cleaning device 120 comprises, in addition to the wiper 121, a drive arm 122 able to move with respect to the protective window 140 and configured to drive the wiper 121 in its movement. As depicted in FIG. 3, this drive arm 122 comprises a guide part 132 which extends at least partially under the detection module 101 of the driver assistance system 100 according to the invention and at least one connector 133 which connects this guide part 132 to the wiper 121. According to the example illustrated here, the guide part 132 comprises a carriage configured to slide in a rail 134, depicted schematically in FIG. 3, under the detection module 101, the carriage being set in motion in the rail by a belt driven by an actuator, neither of these being depicted here. This guide part 132 thus forms a mobile portion of the drive arm 122 able to drive the wiper 121 in the rectilinear main direction D, via the connector 133 which contributes to transmitting the movement of the drive arm 122 to the wiper 121.

It is be appreciated that the wiper 121 is able to move in the two opposite senses of direction in this rectilinear main direction D. Thus, according to one particular embodiment of the present invention, a parked position of the wiper 121 corresponds to this wiper 121 being positioned at a (virtual) junction between the first portion 141 of the protective window 140 and the second portion 142 of this protective window 140. Thus, depending on which portion requires cleaning, the wiper 121 is able selectively to clean one or the other of these portions without impeding the image acquisition performed by the driver assistance sensor 110, 130 positioned behind that portion of the protective window 140 that does not require cleaning.

Figure 3:
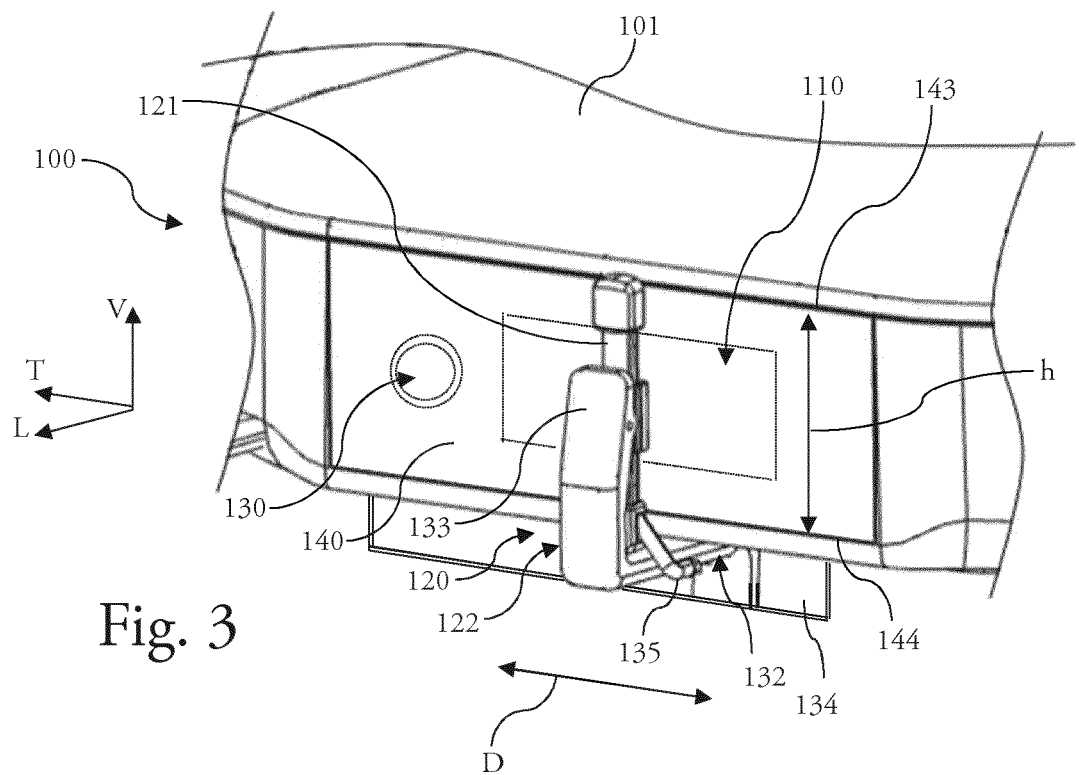
FIG. 3 illustrates, in perspective, the driver assistance system according to the invention which comprises the detection module and the cleaning device dedicated to this detection module.

In addition, according to the example illustrated FIG. 3, the cleaning device 120 also comprises a washer fluid inlet 135. This washer fluid is thus, according to the example illustrated here, injected directly into washer fluid distribution ducts which may, for example, be created inside the wiper 121 or on the surface thereof.

It must be appreciated that this is merely one example and that the drive arm 122 of the cleaning device 120 may adopt some other form without departing from the context of the invention provided that it allows the wiper 121 to move in the rectilinear main direction D.

It will also be noted that the wiper 121 extends over an entire height h of the protective window 140, namely a dimension of this protective window 140 measured parallel to the vertical axis V of the trihedron, namely perpendicular to the main direction of displacement D of the wiper 121 between two edges 143, 144 that delimit this protective window 140 vertically. In other words, the wiper 121 is in contact with the entirety of the protective window 140 over its vertical dimension, so as to ensure complete cleaning of the surface of this protective window 140 when the wiper is moved longitudinally from one end of the protective window to the other. More specifically, and as will be detailed more fully hereinbelow, the wiper 121 comprises a wiper blade rubber and it is this wiper blade rubber that is effectively pressed firmly against the protective window and wipes same. According to the invention, the pressure on this wiper blade rubber is applied for example by one or more elastic re turn device(s) or else by an elastic return effect inherent to this wiper blade rubber.

Advantageously, when the protective window 140 is curved, provision may be made for the wiper to conform to this curvature so as to ensure optimum wiping of this protective window 140.

Figure 4:
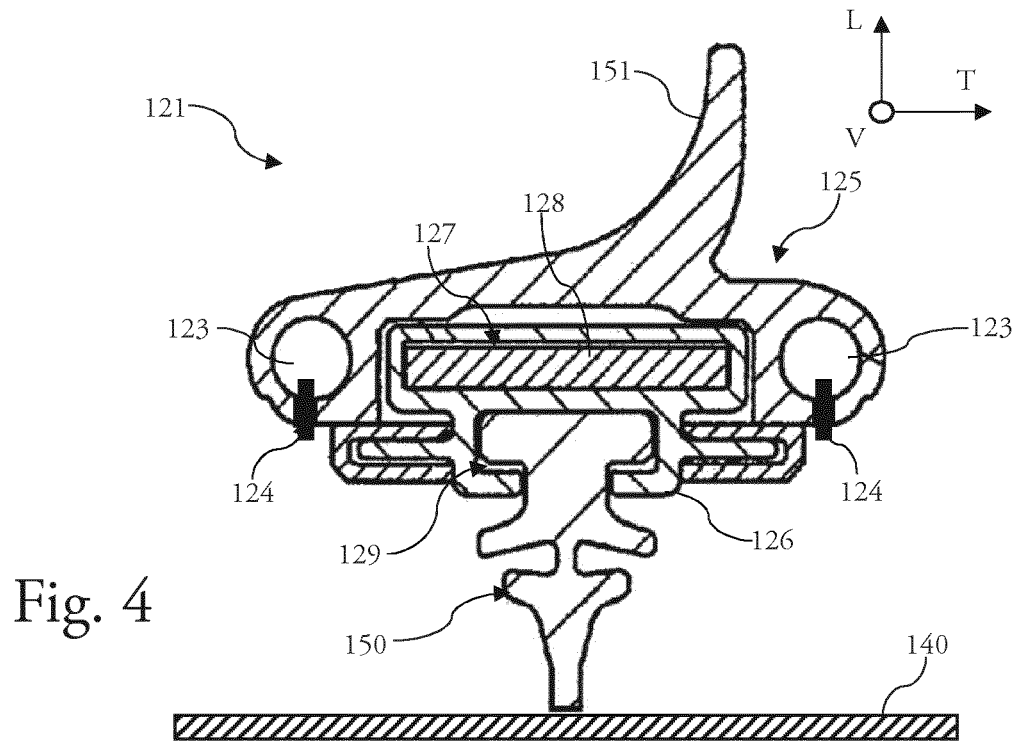
FIG. 4 is a view in transverse section of the cleaning device installed in the driver assistance system according to the invention.

FIG. 4 illustrates one embodiment of the wiper 121 of this cleaning device 120. This wiper 121 extends mainly in a vertical direction, namely a direction parallel to a main plane of extension of the protective window 140 and perpendicular to the rectilinear main direction of displacement D of the wiper 121. As depicted, this wiper 121 comprises at least one washer fluid distribution duct 123, advantageously two washer fluid distribution ducts 123, equipped with washer fluid spray orifices. It is possible to provide one or more washer fluid spray nozzle(s) 124 associated with the washer fluid distribution duct 123, to optimize the spraying of fluid. For example, these distribution ducts 123 may extend over an entire length of the wiper 121, namely in the vertical direction. Advantageously, the wiper 121 comprises a plurality of spray nozzles 124 distributed over an entire length of the distribution duct(s) 123. More specifically, the washer fluid distribution ducts 123 are formed in an accessory 125 of the wiper 121. As depicted, this accessory 125 is mounted on a support 126 which comprises a housing 127 configured to accept a stiffening beam 128 of the wiper 121, and at least a space 129 configured to receive a wiper blade rubber 150 intended to be pressed, notably by virtue of the beam 128, firmly against the protective window 140 that is to be cleaned. Optionally, the accessory 125 may also comprise an air deflector 151 which also contributes to pressing the wiper blade rubber firmly against the protective window.

Although not illustrated here, the washer fluid distribution duct(s) 123 is/are also fluidically connected to a washer fluid reservoir.

It will be appreciated from the foregoing that the cleaning device 120 implements a mechanical wiping of the protective window 140, by rubbing, so that the quantities of washer fluid needed for this wiping are reduced, thus making it possible to reduce the size of the washer fluid storage reservoir and therefore the overall weight of the detection system 100 according to the invention. The fact that the washer fluid distribution duct(s) 123 and the spray nozzles 124 are formed directly on the wiper 121 also contributes, together with the use of mechanical wiping, towards reducing the quantity of washer fluid used. However, provision could also be made for the spray nozzles to be arranged a non-zero distance away from the wiper, without departing from the context of the present invention.

Figure 5:
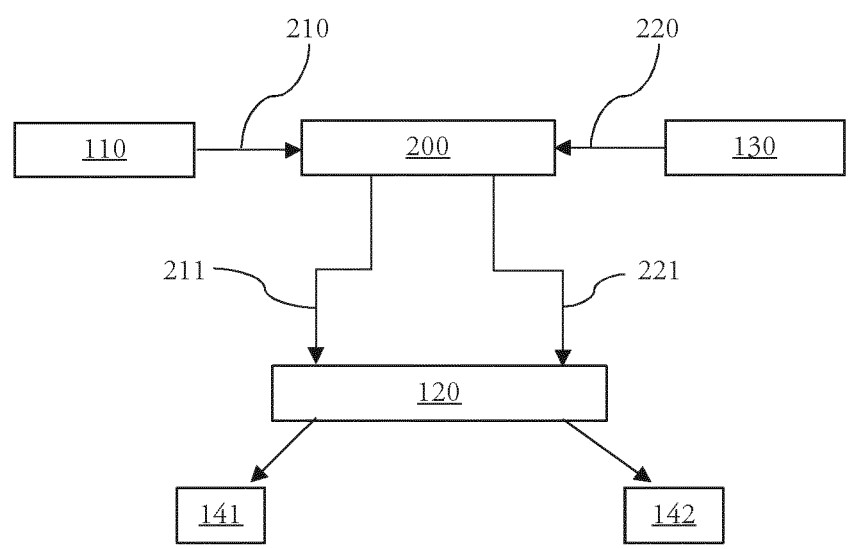
FIG. 5 illustrates, in the form of a block diagram, a method for cleaning the drive assistance system according to the invention.

FIG. 5, for its part, illustrates one example of method for cleaning the driver assistance system according to the invention. As illustrated, when the detection member 110 or the camera 130 detects the presence of a disruptive element lying, respectively, in its field of view or in the path of the waves it emits, the detection member 110 or the camera 130 respectively issues a corresponding first item of information 210 or a second item of information 220 to a control unit 200. This control unit 200 is then configured to issue, according to whether it has received the first item of information 210 or the second item of information 220, a first instruction 211 allowing cleaning of the first portion 141 of the protective window 140, or a second instruction 221 allowing cleaning of the second portion 142 of this protective window 140.

A "disruptive element" is understood here to be an element that hampers, or even prevents, the acquisition of information by one or other of the driver assistance sensors 110, 130. Thus, this disruptive element may be for example dirt, organic matter, or any other detritus that could be deposited on the protective window 140.

The first instruction 211 may be divided into two sub-instructions: a first sub-instruction issued to the actuator associated with the wiper guide rail, which allows the wiper to be set in motion in the main direction of travel of this wiper, and a second sub-instruction issued to the spray nozzles to start or stop the spraying of washer fluid. For example, the quantity of washer fluid to be sprayed may be determined according to what disruptive element is detected, namely according to the level of fouling of the protective window, this level of fouling being directly correlated with the loss of information during image acquisition by the driver assistance sensor protected by the portion of the protective window that is to be cleaned. Thus, the spraying of a minimal, or even zero, quantity of washer fluid may be envisioned when the rubbing of the wiper blade rubber against this protective window is sufficient by itself to eliminate the disruptive element, and the spraying of a maximum quantity of washer fluid may be envisioned when image acquisition is completely prevented by the disruptive element.

The detail of the second instruction is identical, except as regards the sense of the direction in which the wiper moves as a result of the first sub-instruction.

Were the control unit 200 to receive the first item of information 210 and the second item of information 220 simultaneously, an order of priority is defined ahead of this so that only one of the two portions 141, 142 of the protective window 140 is cleaned at a time. For example, the first portion 141 of the protective window 140 will be cleaned before the second portion 142 of this protective window 140, which is to say that, in this example the choice is made to restore total and optimal operation to the first driver assistance sensor 110 as a matter of prior and then afterwards, to the second driver assistance sensor 130.

The present invention thus proposes a simple, inexpensive and effective means that is able both to protect the driver assistance sensors against potential external attack and ensure permanent operation of at least one of these driver assistance sensors without which a self-driving vehicle, or partially self-driving vehicle, is unable to operate.

The present invention is not limited to the means and configurations described and illustrated herein, however, but also extends to any equivalent means or configuration and to any technically functional combination of such means. In particular, the shape and the layout of the first driver assistance sensor, of the second driver assistance sensor and of the cleaning device may be modified without detriment to the invention, provided that they provide the functionalities described the present document.

The invention claimed is:

1. A driver assistance system for a motor vehicle, comprising:
   a detection module comprising a first driver assistance sensor, a second driver assistance sensor, and a protective window closing the detection module and protecting both the first driver assistance sensor and the second driver assistance sensor; and
   a cleaning device configured to clean the protective window, the cleaning device comprising at least one wiper in contact with the protective window and moveable in a rectilinear main direction of displacement;
   wherein the protective window comprises a first portion which protects the first driver assistance sensor and a second portion which protects the second driver assistance sensor, the cleaning device being configured to selectively clean the first portion and the second portion of the protective window; and
   wherein a parking position of the wiper along the main direction of displacement is positioned at a junction between the first portion and the second portion of the protective window.

2. The driver assistance system according to claim 1, wherein the wiper comprises at least one washer fluid distribution duct configured to be connected to a washer fluid reservoir.

3. The driver assistance system according to claim 1, wherein the protective window comprises an interior face facing toward at least one of the first driver assistance sensor or the second driver assistance sensor, the interior face comprising an anti-reflection coating.

4. The driver assistance system according to claim 3, wherein the protective window has a curvature identical, or nearly identical, to a curvature of at least one of the first driver assistance sensor or the second driver assistance sensor.

5. The driver assistance system according to claim 1, wherein the protective window has a curvature identical, or nearly identical, to a curvature of at least one of the first driver assistance sensor or the second driver assistance sensor.

6. The driver assistance system according to claim 1, wherein the cleaning device is configured to clean the first portion of the protective window and the second portion of the protective window alternately.

7. The driver assistance system according to claim 1, wherein the first driver assistance sensor is a detection member using wave emission.

8. The driver assistance system according to claim 7, wherein the protective window is permeable at least to wavelengths emitted by the detection member.

9. The driver assistance system according to claim 1, wherein the second driver assistance sensor is a camera.

10. A method for cleaning a driver assistance system for a motor vehicle, the driver assistance system comprising a detection module and a cleaning device, the detection module comprising a first driver assistance sensor, a second driver assistance sensor, and a protective window closing the detection module and protecting both the first driver assistance sensor and the second driver assistance sensor, the cleaning device being configured to clean the protective window and comprising at least one wiper in contact with the protective window and able to move in a rectilinear main direction of displacement, the protective window comprising a first portion which protects the first driver assistance sensor and a second portion which protects the second driver assistance sensor, wherein the cleaning device is configured to selectively clean the first portion of the protective window and the second portion of the protective window, wherein a parking position of the wiper along the main direction of displacement is positioned at a junction between the first portion and the second portion of the protective window, the method comprising:
   receiving, by a control unit, a first item of information issued by the first driver assistance sensor or a second item of information issued by the second driver assistance sensor, the first item of information or the second item of information relating to a presence of a disruptive element on the first portion of the protective window or on the second portion of the protective window, respectively; and
   cleaning, by the cleaning device, the first portion of the protective window subsequent to the control unit issuing a first instruction in response to receiving the first item of information issued by the first driver assistance, or cleaning, by the cleaning device, the second portion of the protective window subsequent to the control unit issuing a second instruction in response to receiving the second item of information issued by the second driver assistance sensor.

* * * * *